No. 623,155. Patented Apr. 18, 1899.
R. W. HUBBARD.
SNAP HOOK.
(Application filed Mar. 11, 1898.)

(No Model.)

Witnesses:

Inventor
R. W. Hubbard
By James J. Sheehy
Attorney

UNITED STATES PATENT OFFICE.

RICHARD W. HUBBARD, OF ASHTABULA, OHIO.

SNAP-HOOK.

SPECIFICATION forming part of Letters Patent No. 623,155, dated April 18, 1899.

Application filed March 11, 1898. Serial No. 673,442. (No model.)

*To all whom it may concern:*

Be it known that I, RICHARD W. HUBBARD, a citizen of the United States, residing at Ashtabula, in the county of Ashtabula and State of Ohio, have invented new and useful Improvements in Snap-Hooks, of which the following is a specification.

My invention relates to snap-hooks, and contemplates the provision of a snap-hook which while very cheap and simple is strong and durable and capable of withstanding great strain.

The invention will be fully understood from the following description and claims when taken in conjunction with the annexed drawings, in which—

Figure 1:
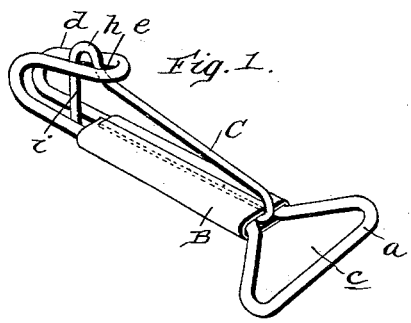
Figure 2:
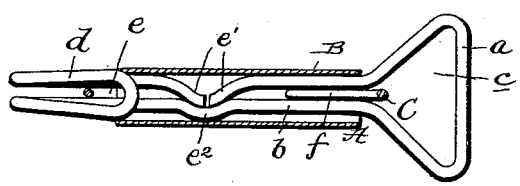
Figure 3:
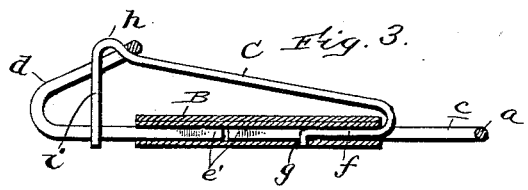
Figure 4:

Figure 1 is a perspective view of my improved snap-hook. Fig. 2 is a plan view, with parts in section, of the same. Fig. 3 is a longitudinal vertical section. Fig. 4 is a detail of a modification.

Referring by letter to the said drawings, A designates the body of the snap-hook. This body A is made of wire $a$ of suitable caliber and comprises the shank $b$, the eye $c$ at one end of the shank, designed for the connection of a strap or the like, and the hook proper, $d$, at the opposite end of the shank, which terminates in an eye $e$, as shown, for a purpose presently described. In forming the said body A a piece of wire of suitable length is bent in the manner shown in Fig. 2—that is to say, with two parallel portions of the wire forming the shank $b$ and merging at the opposite ends of the same into the eye $c$ and hook proper, $d$. The ends of the piece of wire are arranged contiguous to each other at about the middle of one of the parallel portions forming the shank $b$ and are bent, as indicated by $e'$, and seated in a deflection $e^2$ in the other parallel portion of the shank after the manner better shown in Fig. 2. In virtue of this it will be seen that when the shank $b$ is surrounded by a sleeve B, adapted to prevent the ends $e'$ of one portion of the shank from moving laterally out of the deflection $e^2$ in the other parallel portion of the shank, the said ends $e'$ will be effectually prevented from pulling apart. In this way a strong connection of the ends of the piece of wire $a$ may be effected without the necessity of resorting to welding, and in consequence a strong hook-body may be produced very cheaply, which is a desideratum. It will also be observed that the eye $c$ and hook proper, $d$, of the body are made open and cannot, therefore, be filled up with and impaired by dirt.

The sleeve B is of sheet metal and is preferably secured in position by bending it around the shank $b$, as shown in Fig. 1, or in any other suitable manner that will enable it to serve the purpose before stated.

C designates the tongue of the hook, which normally rests in the eye $e$ and closes the hook, as shown in Figs. 1 and 3. The said tongue is formed of a single piece of resilient metal, preferably wire, and terminates at one end in a portion $f$, which rests in the sleeve B between the parallel portions of the shank $b$ and has its end secured to the sleeve, preferably by being passed through an aperture $g$ in the same, as shown in Fig. 3. At its opposite or free end, which is designed to rest in the eye $e$ of the hook proper, $d$, the tongue C has the rounded portion $h$ and the angularly-disposed portion $i$, the former being designed to enable a ring or the like to ride over the tongue and into the hook proper, $d$, and the latter having for its purpose to retain the ring in the hook proper, and thereby prevent the said ring from moving back to a position between the tongue and the shank $b$ of the hook-body, where any sudden strain placed upon it would be liable to break the tongue.

It will be readily appreciated from the foregoing that my improved hook may be readily snapped into engagement with a ring or the like and that while there is no liability of its being casually disconnected it may be disconnected when desired by simply pressing the free portion of the tongue toward the shank of the body and withdrawing the hook proper from the ring.

Like the body A the tongue C and the manner in which it is connected with the body are strong and at the same time very simple and easily made, as is desirable.

In lieu of bending the wire forming the hook-body, as shown in Fig. 2, so as to secure the ends together, it may be bent after the manner shown in Fig. 4, or, if desired, the ends may be welded together. I also desire it understood that the ends of the piece of wire forming the hook-body may be connected together at any desired point without departing from the scope of my invention.

Having thus described my invention, what I claim is—

1. In a hook, the body described made of the single piece of wire with parallel portions forming the shank, and having a deflection in one parallel portion and the ends of the piece of wire arranged contiguous to each other at an intermediate point of the other parallel portion and bent laterally and seated in the deflection, and a suitable means on the shank for holding the ends of the piece of wire in the deflection thereof, substantially as specified.

2. In a hook, the combination of the body described made of the single piece of wire with parallel portions forming the shank and merging at the opposite ends thereof into an eye and hook proper; said body having a deflection in one parallel portion of the shank and also having the ends of the piece of wire arranged contiguous to each other at an intermediate point of the other parallel portion and bent laterally and seated in the deflection, and a sleeve mounted on the shank of said body, substantially as specified.

3. In a snap-hook, the combination of a body comprising a shank and a hook proper at one end of the shank terminating in an eye, a sheet-metal sleeve mounted on the shank of the hook, and a spring-tongue having one end arranged in the sleeve and extended through an aperture therein and also having the rounded portion $h$ and the angularly-disposed portion $i$ at its opposite end, substantially as specified.

4. In a hook, the combination of the body described made of the single piece of wire with parallel portions forming the shank and merging at the opposite ends thereof into an eye and hook proper; said body having a deflection in one parallel portion of the shank and also having the ends of the piece of wire arranged contiguous to each other at an intermediate point of the other parallel portion and bent laterally and seated in the deflection, a sheet-metal sleeve mounted on the shank of the said body, and a spring-tongue having one end arranged in the sleeve and extended through an aperture therein and also having the rounded portion $h$ and the angularly-disposed portion $i$ at its opposite end, substantially as specified.

In testimony whereof I have hereunto set my hand in presence of two subscribing witnesses.

RICHARD W. HUBBARD.

Witnesses:
GEO. C. HUBBARD,
HARRY R. STEWART.